(12) United States Patent
Norman

(10) Patent No.: US 7,637,277 B2
(45) Date of Patent: Dec. 29, 2009

(54) WATER METER IDLER BAR

(75) Inventor: Jamie Norman, Hamilton (CA)

(73) Assignee: Cambridge Brass, Inc., Cambridge, Ontario (CA)

( * ) Notice: Subject to any disclaimer, the term of this patent is extended or adjusted under 35 U.S.C. 154(b) by 190 days.

(21) Appl. No.: 11/425,899

(22) Filed: Jun. 22, 2006

(65) Prior Publication Data

US 2007/0295407 A1   Dec. 27, 2007

(51) Int. Cl.
*F16K 43/00* (2006.01)
(52) U.S. Cl. .............................. 137/15.08; 137/315.06; 285/23
(58) Field of Classification Search .............. 137/15.03, 137/315.06, 15.08; 285/23, 30, 332.2, 332, 285/363
See application file for complete search history.

(56) References Cited

U.S. PATENT DOCUMENTS

| | | | | |
|---|---|---|---|---|
| 3,511,524 A | * | 5/1970 | Ford et al. | 285/30 |
| 4,083,383 A | * | 4/1978 | Antoniello | 137/616.7 |
| 5,120,203 A | * | 6/1992 | Priestly | 285/332.2 |
| 5,160,174 A | * | 11/1992 | Thompson | 285/32 |
| 5,251,942 A | * | 10/1993 | Whaley | 285/355 |
| 5,791,693 A | * | 8/1998 | Crawford | 285/23 |

* cited by examiner

*Primary Examiner*—Kevin L Lee
(74) *Attorney, Agent, or Firm*—Shook Hardy & Bacon LLP

(57) ABSTRACT

A water meter idler bar for use during manufacture, shipping and installation of a water meter setter to ensure and maintain proper alignment and spacing between water meter fittings of the water meter setter. Following installation, the idler bar also allows water to flow through the water meter setter prior to installation of a water meter. The idler bar is a rigid PVC pipe having threaded connectors with rubber O-rings at its ends.

10 Claims, 7 Drawing Sheets

WATER METER IDLER BAR

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The invention relates to water meter setters, and in particular to tools used to facilitate manufacture, shipping and installation of meter setters.

BACKGROUND OF THE INVENTION

In municipal water supply applications, water meters are typically installed where a municipal water supply system connects with a residential or commercial water distribution system. For example, in a residential application, such water meters are typically installed where the municipal water supply pipe enters the house. Such water meters measure the volume of water provided to the user so that the municipality can bill the user for the amount of water used.

To facilitate installation, maintenance, replacement and readability of the water meter, water meters are often installed using meter setters. A meter setter is a device interposed between a municipal supply pipe and a building distribution pipe. The meter setter has a space defined in the piping therein for installation of the water meter, so that when the water meter is installed, all water flowing from the supply pipe to the distribution pipe flows through the water meter.

A typical meter setter 18 is shown in FIGS. 1 and 2. Broadly, moving from a supply end to a distribution end, the illustrated meter setter 18 comprises a supply fitting, an inlet pipe 22, an inlet meter fitting 24, an outlet meter fitting 26, an outlet pipe 28 and a distribution fitting. Other features such as check valves and shut-off valves are also illustrated but are not described herein as they are not directly relevant to the present invention.

The illustrated meter setter 18 is installed between a supply pipe (not shown) and a distribution pipe (also not shown). The supply fitting 20 of the meter setter 18 is connected to the supply pipe while the distribution fitting 30 is connected to the distribution pipe. The water meter (not shown) is then installed between the inlet and outlet meter fittings 24 and 26.

During manufacture of meter setters 18, it is often challenging to ensure that the inlet and outlet meter fittings 24, 26 are positioned correctly. Failure to ensure that these fittings 24, 26 are aligned and appropriately spaced can result in difficulty installing the water meter, and can indeed cause damage to the water meter during installation, particularly if the water meter being installed has plastic connectors.

Further, proper alignment and spacing of the inlet and outlet meter fittings 24, 26 can be compromised during rough handling associated with shipping of the meter setter 18. To avoid such damage, complex, bulky and expensive shipping containers and packing are often used for shipping meter setters 18.

Additionally, during installation of the meter setter 18, particularly if the positioning of the supply and distribution pipes do not match the positioning of the supply and distribution fittings 20, 30 of the meter setter 18 precisely, the meter setter 18 can sometimes become slightly warped resulting in misalignment of the inlet and outlet meter fittings 24, 26.

Finally, there can often arise delays between installation of the meter setter 18 and installation of the water meter within the meter setter 18. This can result for example where the meter setter 18 is installed during construction of a new house, but the water meter itself is not installed until some time thereafter when municipal installers are able to attend at the house. In such instances, it is often useful to provide a fluid connection between the inlet and outlet meter fittings 24, 26 such that water may be supplied to the house pending installation of the water meter. In order to effect this fluid connection, installers often provide ad hoc solutions such as the installation of a hose or a manually threaded PVC pipe between the two fittings. However, such solutions can require time on the part of the installer to find or fashion an appropriate device to fit between the inlet and outlet meter fittings 24, 26, and to install the device in the meter setter 18. Furthermore, such devices may or may not be able to effectively withstand the pressure exerted by the water, either at the connections to the inlet and outlet meter fittings 24, 26, or within the device itself.

SUMMARY OF THE INVENTION

The present invention provides a water meter idler bar which seeks to address one or more of the problems noted above.

In accordance with a broad aspect, the present invention provides a water meter idler bar for aligning and fluidly connecting water meter fittings of a water meter setter, said idler bar comprising: a substantially rigid fluid-conducting pipe having two ends and a length approximating a distance between inlet and outlet connections of a water meter to be installed in the meter setter; and each of said two ends of said pipe having connectors to fluidly and substantially rigidly connect the pipe to the water meter fittings of the water meter setter.

In other optional aspects, each of the connectors has a seal to seal the fluid connections between the pipe and the water meter fittings, each of the connectors comprises exterior threading on the pipe, the pipe flares outwardly towards each of the two connectors, and the pipe is PVC.

In accordance with another broad aspect, the invention provides a method of manufacturing and shipping water meter setters, said method comprising: during manufacturing, installing a water meter idler bar between water meter fittings of the water meter setter to ensure proper alignment and spacing of the water meter fittings, said idler bar comprising a substantially rigid bar having two ends and a length approximating a distance between inlet and outlet connections of a water meter to be installed in the meter setter, each of said two ends of said bar having connectors to substantially rigidly connect the bar to the water meter fittings of the water meter setter; and during shipping of the water meter setter, maintaining the idler bar between the water meter fittings to maintain proper alignment and spacing of the water meter fittings.

In a further optional aspect of the above method, the bar is a fluid-conducting pipe, the connectors fluidly connect the bar to the water meter fittings of the water meter setter, and the method further comprises: maintaining the idler bar between the water meter fittings of the water meter setter following installation of the water meter setter to allow water to flow through the meter setter prior to installation of the water meter therein.

In accordance with a third broad aspect, the invention provides a method of shipping water meter setters, said method comprising: during shipping, installing a water meter idler bar between water meter fittings of the water meter setter to maintain proper alignment and spacing of the water meter fittings during shipping, said idler bar comprising a substantially rigid bar having two ends and a length approximating a distance between inlet and outlet connections of a water meter to be installed in the meter setter, each of said two ends of said bar having connectors to substantially rigidly connect the bar to the water meter fittings of the water meter setter.

In a further optional aspect of the above method, the bar is a fluid-conducting pipe, and the connectors fluidly connect the bar to the water meter fittings of the water meter setter, said method further comprising: maintaining the idler bar between the water meter fittings of the water meter setter following installation of the water meter setter to allow water to flow through the meter setter prior to installation of the water meter therein.

Other features of the invention will be understood from the detailed description of preferred embodiments of the invention below and from the drawings attached hereto.

BRIEF DESCRIPTION OF THE SEVERAL VIEWS OF THE DRAWINGS

Preferred embodiments of the invention will now be described with reference to the attached drawings in which.

DETAILED DESCRIPTION OF THE INVENTION

Figure 1:
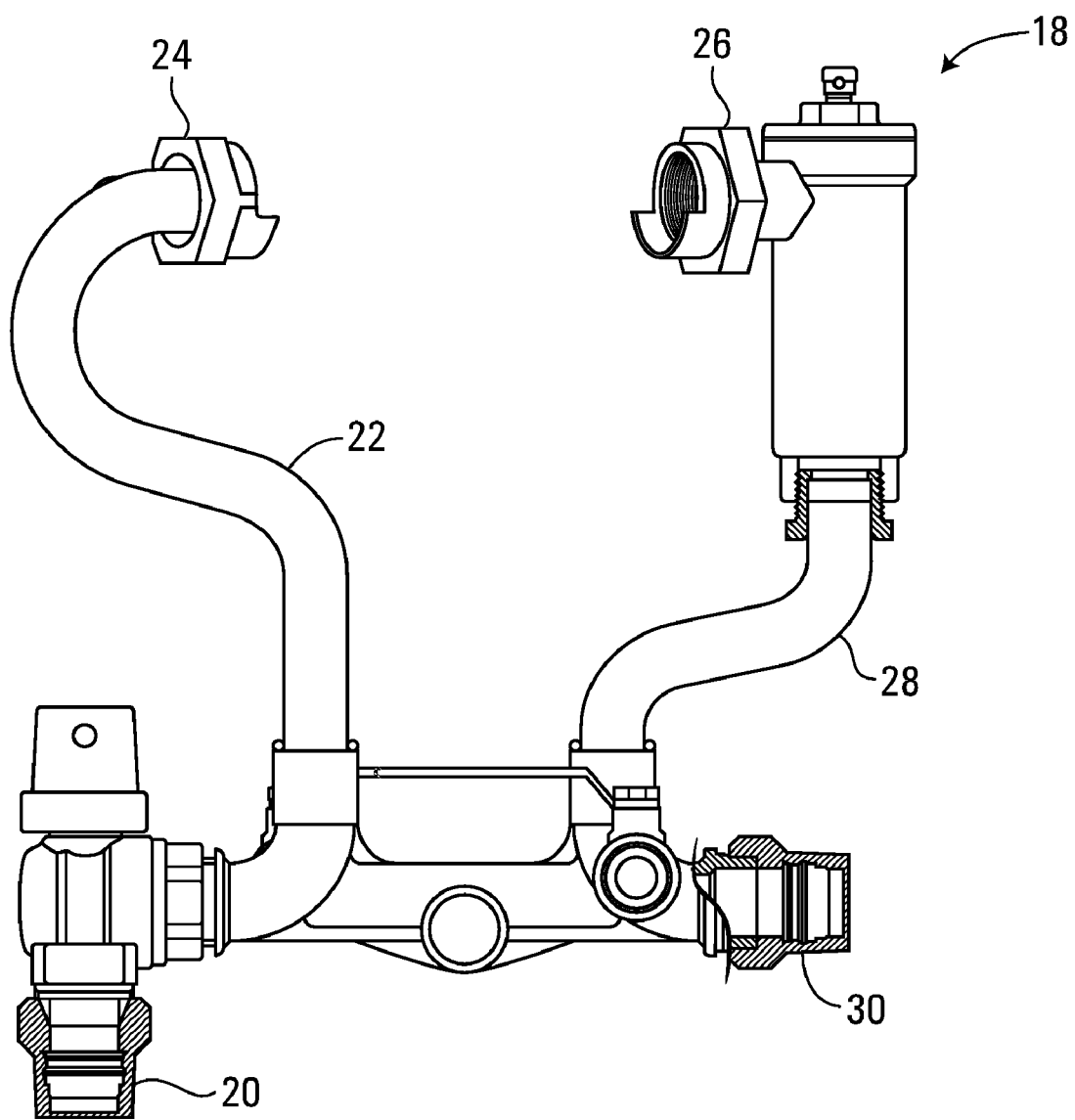
FIG. 1 is a side partial cross-sectional view of a typical water meter setter.

A preferred embodiment of a water meter idler bar of the present invention will now be described.

As shown in FIGS. 3 to 6, the preferred embodiment water meter idler bar 50 comprises a fluid-conducting pipe 52 having a middle section 54, connectors 56 defined at its ends 58, and flaring sections 60 between the middle section 54 and the connectors 56. The pipe 52 is made of a material providing sufficient rigidity to define and maintain proper alignment and spacing between the meter fittings 24, 26 of the water meter setter 18 when the idler bar 50 is installed therein. The pipe also has a wall thickness sufficient to withstand the pressure exerted by water flowing through the pipe 52. In the preferred embodiment, the pipe 52 is made from general purpose PVC, has an internal diameter of 0.62" and has a wall thickness in its middle section 54 of between 0.15" to 0.30", and more preferably between 0.20" to 0.25".

The connectors 56 allow for mechanical and fluid connection between the idler bar 50 and the meter fittings 24, 26 of the meter setter 18. In the preferred embodiment, the connectors 56 comprise external threading 62 defined on an outside surface of the ends 58 of the pipe 52. This threading 62 cooperates with internal threading defined in the meter fittings 24, 26 to create the required mechanical and fluid connection. In the preferred embodiment, the connectors 56 are adapted to accommodate fittings complying with the AWWA C700 standard for water meter connections.

To seal the connection between the idler bar 50 and the meter fittings 24, 26, O-ring seals 64 are provided in recesses 66 defined at the ends 58 of the idler bar 50. Seal shoulders 63 are provided surrounding the recesses 66 to prevent over-tightening of the meter fittings 24, 26 onto the idler bar 50, which over-tightening may result in damage to the idler bar 50 or to the seals 64. In the preferred embodiment, the seals 64 are gaskets made of neoprene rubber.

An outer surface of the pipe 52 flares outwardly 60 between its middle section 54 and its connectors 56 to provide a smooth transition between these sections of the pipe 52. As a result, the connectors 56 are defined on a portion of the pipe 52 having a greater wall thickness than the middle section 54 of the pipe 52. This greater wall thickness provides rigidity which assists the connectors 56 in creating a secure connection between the idler bar 50 and the meter fittings 24, 26.

The idler bar 50 has a length approximating a distance between inlet and outlet connections (not shown) of a water meter to be installed in the meter setter 18.

Figure 2:
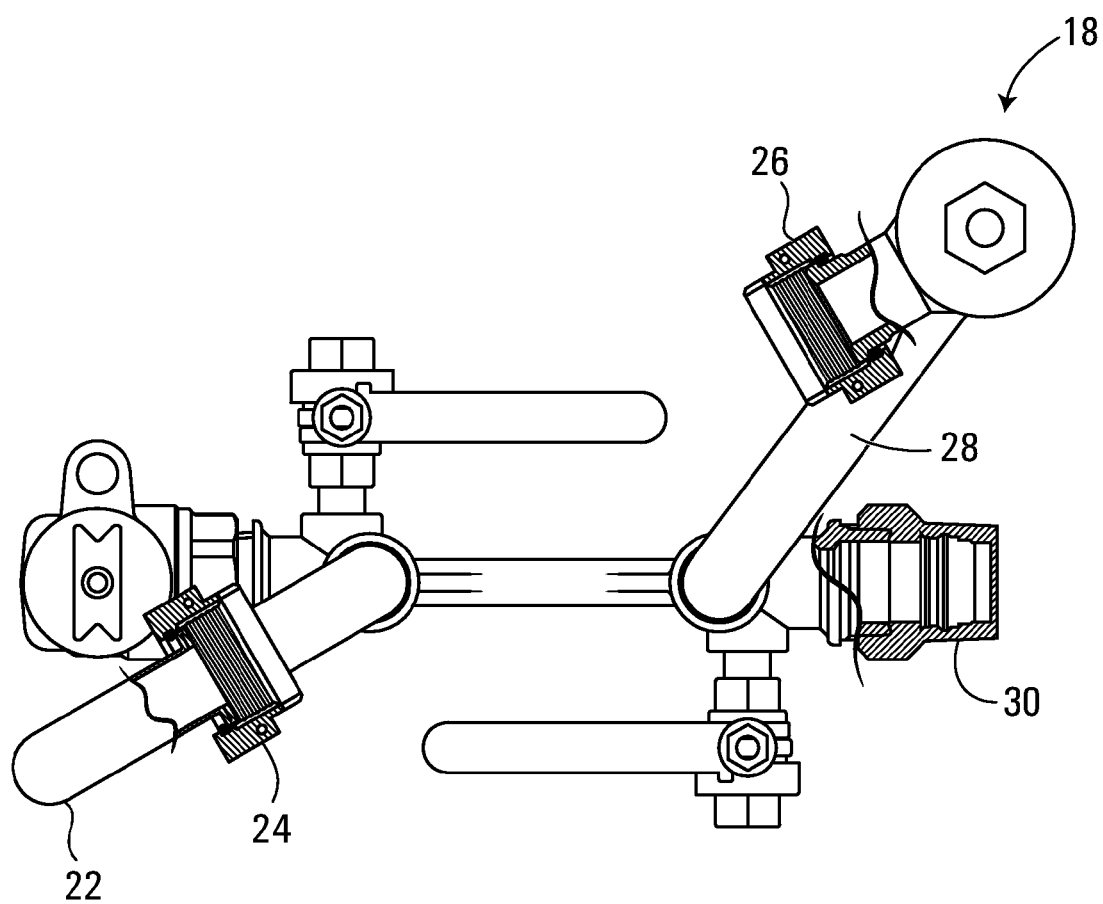
FIG. 2 is a top partial cross-sectional view of the water meter setter of FIG. 1.
Figure 3:
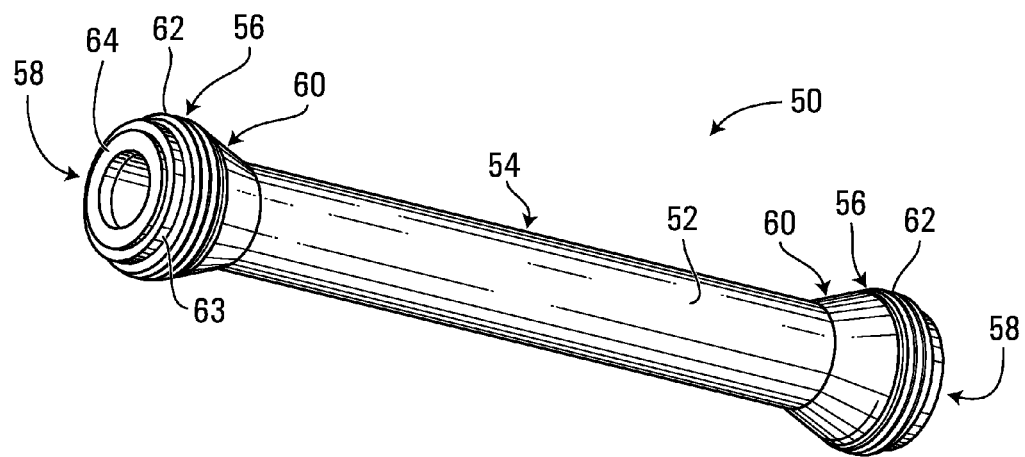
FIG. 3 is a perspective view of a water meter idler bar in accordance with a preferred embodiment of the present invention.
Figure 4:
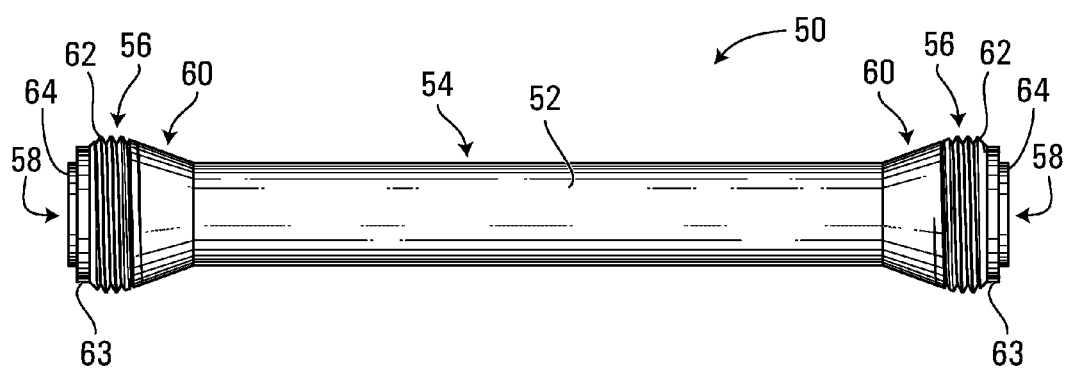
FIG. 4 is a side view of the idler bar of FIG. 3.
Figure 5:
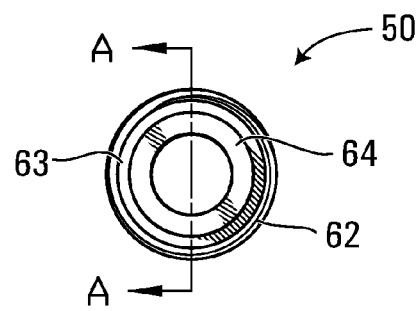
FIG. 5 is an end view of the idler bar of FIG. 3.
Figure 6:
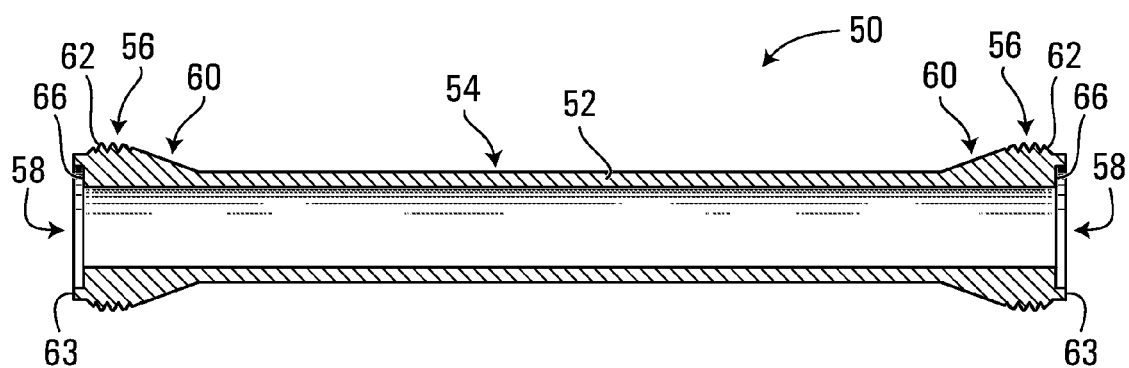
FIG. 6 is a side cross-sectional view of the idler bar of FIG. 3 without its seals, taken along A-A as marked in FIG. 5.
Figure 7:
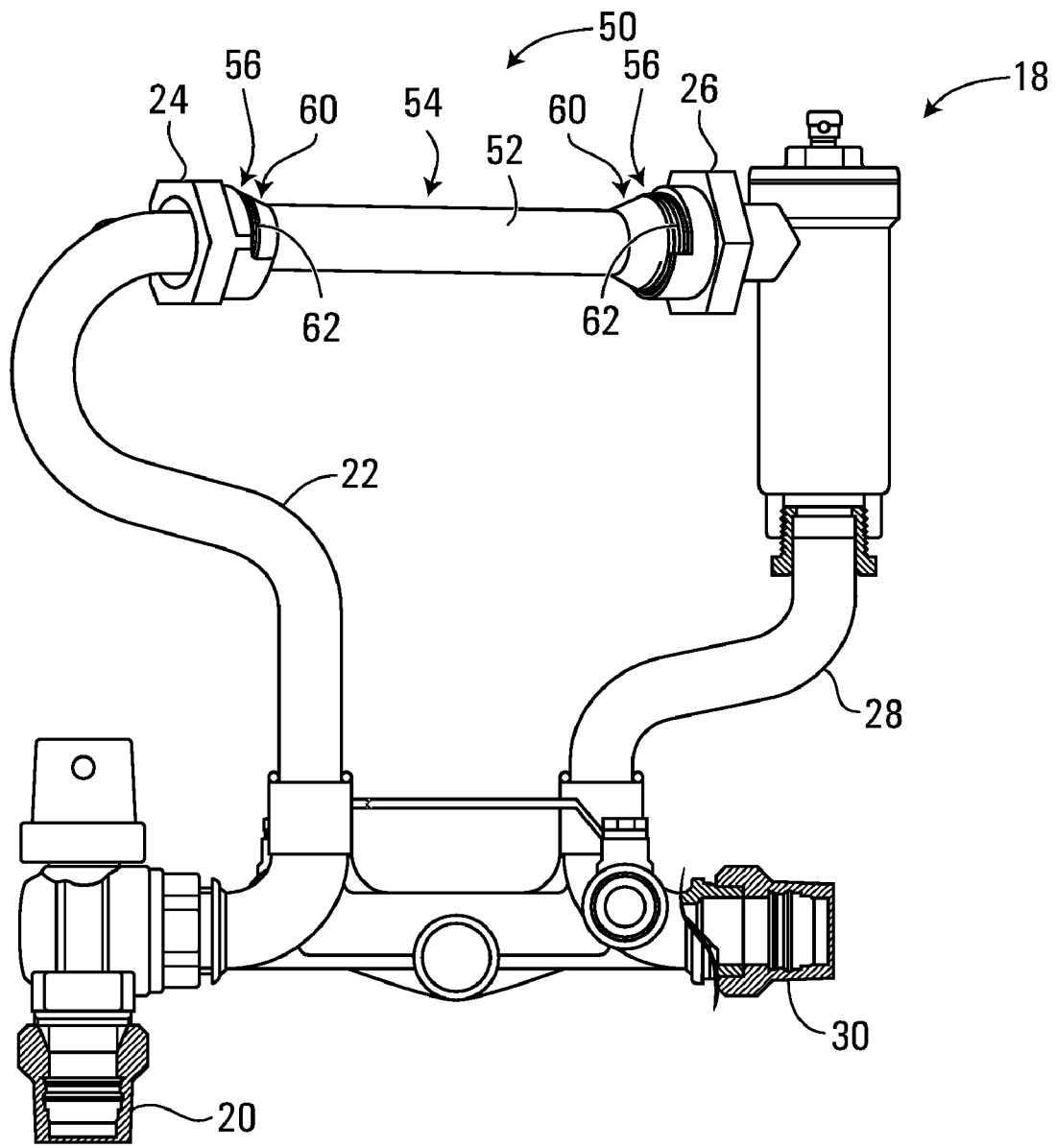
FIG. 7 is a side partial cross-sectional view of the idler bar of FIG. 3 installed within the water meter setter of FIG. 1.
Figure 8:
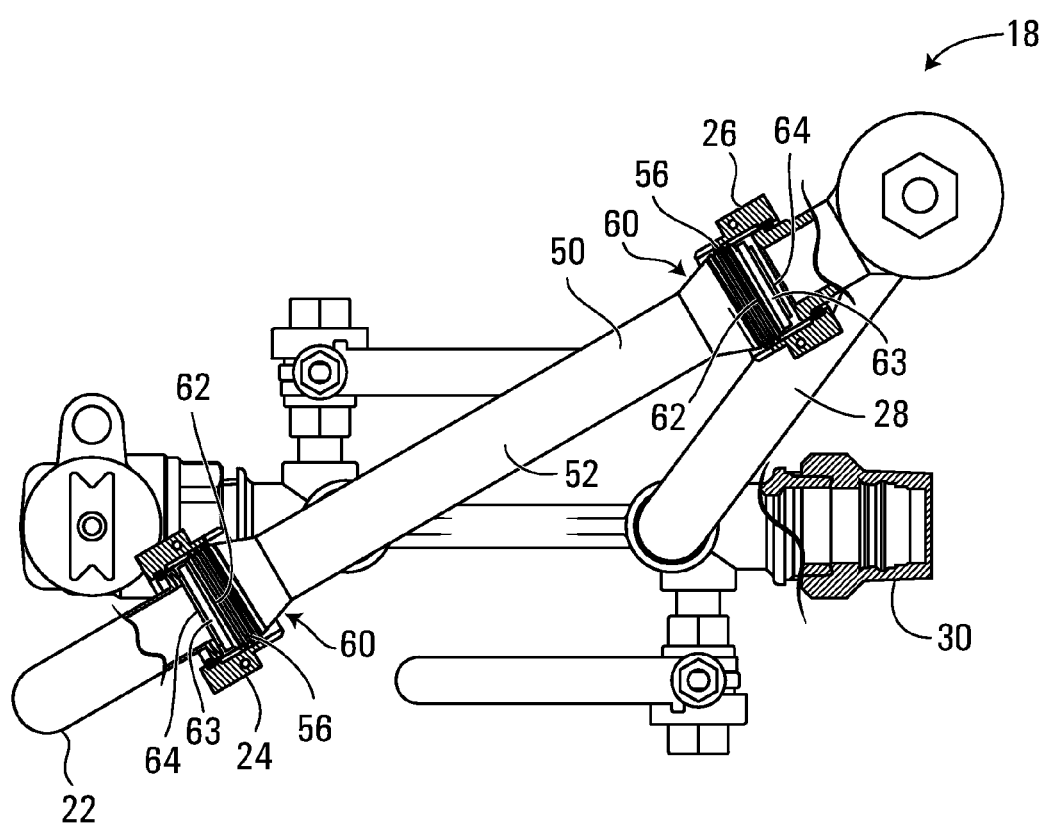
FIG. 8 is a top partial cross-sectional view of the idler bar of FIG. 3 installed within the water meter setter of FIG. 1.

As shown in FIGS. 7 and 8, in use the preferred embodiment idler bar 50 is installed between the meter fittings 24, 26 of the exemplary meter setter 18 shown in FIGS. 1 and 2. The meter fittings 24, 26 are operated to threadedly engage the external threading 62 of the connectors 56 of the idler bar 50, compressing the seals 64 between the meter fittings 24, 26 and the ends 58 of the idler bar 50, thereby creating substantially rigid, fluidly communicating and sealed connections between the idler bar 50 and the meter fittings 24, 26. For ease of understanding, in FIG. 8, the outlet meter fitting 26 has not yet fully engaged the idler bar 50. Further turning of the outlet meter fitting will result in complete engagement.

A method of using the idler bar 50 in manufacturing, shipping and installation of the meter setter 18 will now be described.

During manufacture of the meter setter 18, typically during the final stages, an idler bar 50 of the present invention having a length approximating the distance between the inlet and outlet connections of the water meter to be installed in the meter setter, is installed between the meter fittings 24, 26 of the meter setter 18 as discussed above. By doing so, the manufacturer can ensure that the meter fittings 24, 26 are positioned in an alignment and spacing appropriate to accommodate eventual installation of the water meter therebetween.

During shipping and installation of the meter setter 18, the idler bar 50 is maintained between the meter fittings 24, 26 so as to ensure that the correct positioning of the meter fittings 24, 26 is maintained.

Once the meter setter 18 is installed, the idler bar 50 is kept in place such that water can flow through the meter setter 18 prior to installation of the water meter.

Of course if the water meter is to be installed contemporaneously with installation of the meter setter 18, the idler bar 50 can be removed once the meter setter 18 is installed, and replaced with the water meter.

Figure 9:
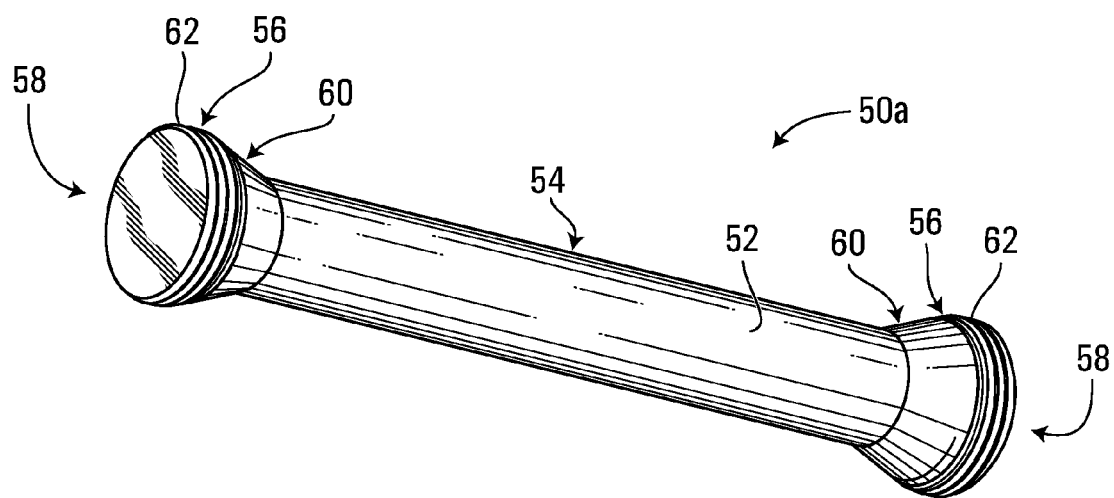
FIG. 9 is a perspective view of a water meter idler bar in accordance with a second embodiment of the present invention.

Optionally, a user may choose to use the idler bar 50 during manufacturing and shipping of the meter setter 18 only, or indeed during shipping only. In such a case, either the preferred embodiment idler bar 50 or a second embodiment of the idler bar 50a as shown in FIG. 9 may be used. This second embodiment idler bar 50a is substantially the same as the preferred embodiment idler bar 50 except that because it will not need to support flow therethrough, the pipe is solid and has no seals 64. It is to be understood that either idler bar 50, 50a may additionally be used during installation of the meter setter 18.

While the idler bar 50 of the present invention has been described as being used in a municipal water supply application, it is to be understood that the idler bar 50 may be used in any water supply application where a water meter is to be installed within the system.

Further, in the above detailed description, the preferred embodiment idler bar 50 has been described in the context of its installation within a very specific type of exemplary meter setter 18. However, it is to be understood that the particular configuration of the meter setter is not an essential element of the invention (so long as the positioning and meter fittings of the meter setter 18 match the positioning and fittings of the idler bar) and that the idler bar 50 can be used with other meter setters.

Very specific geometries, dimensions and materials for the preferred embodiment of the idler bar have been provided. However, it is to be understood that such geometries, dimensions and materials may be varied by persons skilled in the art without necessarily departing from the scope of the invention.

Numerous modifications and variations of the present invention are possible in light of the above teachings. It is therefore to be understood that within the scope of the appended claims, the invention may be practiced otherwise than as specifically described herein.

The invention claimed is:

1. A method of manufacturing and shipping water meter setters, said method comprising:

during manufacturing, installing a water meter idler bar between water meter fittings of the water meter setter to ensure proper alignment and spacing of the water meter fittings, said idler bar comprising a substantially rigid bar having two ends and a length approximating a distance between inlet and outlet connections of a water meter to be installed in the meter setter, each of said two ends of said bar having connectors to substantially rigidly connect the bar to the water meter fittings of the water meter setter; and during shipping of the water meter setter, maintaining the idler bar between the water meter fittings to maintain proper alignment and spacing of the water meter fittings.

2. The method of claim 1 wherein the bar is a fluid-conducting pipe, and the connectors fluidly connect the bar to the water meter fittings of the water meter setter, said method further comprising:

maintaining the idler bar between the water meter fittings of the water meter setter following installation of the water meter setter to allow water to flow through the meter setter prior to installation of the water meter therein.

3. The method of claim 2 wherein each of said connectors has a seal to seal the fluid connections between the bar and the water meter fittings.

4. The method of claim 3 wherein each of the connectors comprises exterior threading on the bar.

5. The method of claim 4 wherein the bar is PVC.

6. A method of shipping water meter setters, said method comprising:

during shipping, installing a water meter idler bar between water meter fittings of the water meter setter to maintain proper alignment and spacing of the water meter fittings during shipping, said idler bar comprising a substantially rigid bar having two ends and a length approximating a distance between inlet and outlet connections of a water meter to be installed in the meter setter, each of said two ends of said bar having connectors to substantially rigidly connect the bar to the water meter fittings of the water meter setter.

7. The method of claim 6 wherein the bar is a fluid-conducting pipe, and the connectors fluidly connect the bar to the water meter fittings of the water meter setter, said method further comprising:

maintaining the idler bar between the water meter fittings of the water meter setter following installation of the water meter setter to allow water to flow through the meter setter prior to installation of the water meter therein.

8. The method of claim 7 wherein each of said connectors has a seal to seal the fluid connections between the bar and the water meter fittings.

9. The method of claim 8 wherein each of the connectors comprises exterior threading on the bar.

10. The method of claim 9 wherein the bar is PVC.

* * * * *